United States Patent
Obaidi (10) Patent No.: US 11,722,492 B1
(45) Date of Patent: Aug. 8, 2023

(54) SYSTEM AND METHOD FOR DYNAMICALLY NEUTRALIZING MALICIOUS ONES OF COMMUNICATING ELECTRONIC DEVICES

(71) Applicant: T-Mobile Innovations LLC, Overland Park, KS (US)

(72) Inventor: Ahmad Arash Obaidi, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 217 days.

(21) Appl. No.: 17/225,765

(22) Filed: Apr. 8, 2021

(51) Int. Cl.
  *H04L 9/40* (2022.01)
  *G16Y 30/10* (2020.01)

(52) U.S. Cl.
  CPC ........ *H04L 63/101* (2013.01); *H04L 63/0254* (2013.01); *H04L 63/1441* (2013.01); *H04L 63/20* (2013.01); *G16Y 30/10* (2020.01)

(58) Field of Classification Search
  CPC .............. H04L 63/101; H04L 63/0254; H04L 63/1441; H04L 63/20
  See application file for complete search history.

(56) References Cited

U.S. PATENT DOCUMENTS

| 2012/0233694 A1* | 9/2012 | Baliga | H04W 12/12 726/23 |
| 2015/0372980 A1* | 12/2015 | Eyada | G06F 21/55 726/1 |
| 2019/0007447 A1* | 1/2019 | Barnes | H04L 63/306 |
| 2019/0207969 A1* | 7/2019 | Brown | G06F 21/552 |
| 2019/0380037 A1* | 12/2019 | Lifshitz | G06N 20/20 |
| 2021/0306372 A1* | 9/2021 | Koral | H04L 43/16 |

FOREIGN PATENT DOCUMENTS

| CN | 112583845 A * | 3/2021 | H04L 63/101 |
| WO | WO-2010102259 A2 * | 9/2010 | G06F 21/44 |

* cited by examiner

*Primary Examiner* — Matthew Smithers
*Assistant Examiner* — Shu Chun Gao
(74) *Attorney, Agent, or Firm* — Shook, Hardy & Bacon L.L.P.

(57) ABSTRACT

Systems and methods are provided for protecting a plurality of electronic devices via a control server. The control server, for example, can receive one or more indications that a first electronic device is considered malicious and add it to a security threat list. Then the control server can communicate the security threat list to others of the electronic devices, networked for communication with each other, such that the other electronic devices reject all communication from any device listed on the security threat list. Next, upon receiving indication from an approved security patch-providing source that a security patch has been applied to the first electronic device, the control server can remove the first electronic device from the security threat list and communicate the updated security threat list to the other electronic devices indicating that it is safe for these electronic devices to again receive communication from the first electronic device.

20 Claims, 5 Drawing Sheets

SYSTEM AND METHOD FOR DYNAMICALLY NEUTRALIZING MALICIOUS ONES OF COMMUNICATING ELECTRONIC DEVICES

BACKGROUND

A typical home can have an average of ten to twenty interconnected electronic devices or Internet of things (IOT) devices that connect a family's home internet with a variety of devices, such as security cameras, smart watches, thermostats, Wi-Fi connected appliances or the like. Such electronic or IOT devices can be vulnerable to attack from malicious devices in communication therewith. On-device malware detection can be used in an effort to prevent such attacks. However, not all IOT devices and communicably coupled electronic devices employ sufficient malware detection, if any. Furthermore, simple IOT devices may not always have enough processing capability to employ such on-device malware detection.

SUMMARY

The present disclosure is directed, in part, to systems and methods for protecting a plurality of electronic devices via a control server that allows trusted electronic devices to communicate with each other and dynamically tracks and communicates to the electronic devices which electronic devices cannot be trusted due to detected malicious activity. According to various aspects of the technology, the control server can receive one or more indications that a first electronic device is considered malicious and add it to a security threat list. Then the control server can communicate the security threat list to others of the electronic devices, networked for communication with each other, such that the other electronic devices reject all communication from any device listed on the security threat list. Next, upon receiving indication from an approved security patch-providing source that a security patch has been applied to the first electronic device, the control server can remove the first electronic device from the security threat list and communicate the updated security threat list to the other electronic devices indicating that it is safe for these electronic devices to again receive communication from the first electronic device. As used herein, an approved security patch-providing source is a third-party application vendor, a third-party server, or any electronic patch source that provides credentials matching approved credentials stored on or accessible by the control server. The approved credentials can be different for different types of electronic devices and/or different brands of electronic devices. Additionally or alternatively, at least some of the approved security patch-providing sources can include the control server itself and/or devices or data storage associated therewith.

According to another aspect, after the first electronic device is placed on the security threat list, the control server can receive requests from at least one of the electronic devices to communicate with the first electronic device. In response, the control server can send instructions to the at least one of the electronic devices to block receipt of any communication from the first electronic device, since it is presently on the security threat list. Then, once the control server receives indication that a security patch has been applied to the first electronic device, the control server removes the first electronic device from the security threat list. Subsequently, when the control server receives additional requests to communicate with the first electronic device, the control server can check the security threat list and determine that the first electronic device is not there, then send instructions back to the requesting electronic devices that it is safe to receive communication from the first electronic device.

According to yet another aspect, systems and methods for protecting the plurality of electronic devices can be configured such that the control server receives indications that the first electronic device is considered malicious and, as a result, adds the first electronic device to a security threat list. The control server can communicate the security threat list to one or more of the plurality of electronic devices. The plurality of electronic devices can be configured to reject all communication from any device on the security threat list, such as the first electronic device. The control server can further receive indication from a pre-certified device or an approved security patch-providing source that a security patch has been applied to the first electronic device. Upon receiving this indication of a patch being applied to the first electronic device, the control server can then retrieve validating data from the first electronic device to confirm that the security patch was applied thereto. Once this validating data is received, the control server can remove the first electronic device from the security threat list. Finally, the control sever can communicate to one or more of the electronic devices an updated security threat list with the first electronic device removed therefrom, such that the one or more electronic devices can again receive communication from the first electronic device.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of this technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, interconnected electronic devices or Internet of things (IOT) devices, such as those that are interconnected within a person's home or within a hospital, can be vulnerable to attack from malicious devices in communication therewith. Such electronic devices or IOT devices can include, for example, security cameras, smart watches, thermostats, Wi-Fi connected appliances or the like. Additionally or alternatively, the electronic devices or IOT devices can include various patient monitors, security cameras, light controls, bed controls, or the like. Traditionally, on-device malware detection can be used in an effort to prevent attacks against such devices. However, not all IOT devices and communicably coupled electronic devices employ sufficient malware detection, if any. Furthermore, simple IOT devices may not always have enough processing capability to employ such on-device malware detection.

A first aspect of the present disclosure is directed to systems and methods for protecting a plurality of electronic devices via a control server that allows trusted electronic devices to communicate with each other and dynamically tracks and communicates to the electronic devices which electronic devices cannot be trusted due to detected malicious activity. Advantageously, simplistic communicably-coupled electronic devices, such as some IOT devices, can safely communicate with other devices without requiring complex on-device malware. Rather, the electronic devices merely receive a list of devices with which communication is disallowed or receive a simple yes or no indication of whether or not it is safe for the electronic device to communicate with another specific one of the electronic devices. The control server dynamically adds and removes electronic devices to and from the security threat list, such that no malware updates or the like are required on the electronic devices or IOT devices themselves.

The system includes a control server and one or more computer storage hardware devices storing computer-usable instructions that, when used by the control server, cause the control server or processors associated therewith to perform steps. The steps include the control server receiving one or more indications that a first electronic device is considered malicious and adding it to a security threat list. Then communicating, via the control server, the security threat list to others of the electronic devices, networked for communication with each other, such that the other electronic devices reject all communication from any device listed on the security threat list. Next, the steps include receiving an indication from one or more approved security patch-providing sources that a security patch has been applied to the first electronic device and, in response, removing, via the control server, the first electronic device from the security threat list. Finally, the steps can include communicating, via the control server, the updated security threat list to the other electronic devices indicating that it is safe for these electronic devices to again receive communication from the first electronic device.

A second aspect of the present disclosure is likewise directed to a method for protecting a plurality of electronic devices via a control server. The method includes receiving an indication with the control server that a first electronic device is considered malicious and, as a result, adding the first electronic device to a security threat list. Then the method includes the steps of the control server receiving requests from one or more electronic devices to communicate with the first electronic device and determining that the first electronic device is on the security threat list. Then, the method includes the control server, in response to this determination regarding the requests, sending instructions to the one or more electronic devices to block receipt of any communication from the first electronic device. The method can also include the control server receiving an indication that a security patch has been applied to the first electronic device or that the first electronic device is no longer considered malicious and, as a result, removing the first electronic device from the security threat list. This method can then include receiving subsequent requests from the one or more electronic devices to communicate with the first electronic device, determining that the first electronic device is not on the security threat list, and thus sending instructions to the one or more electronic devices that it is safe to receive communication from the first electronic device again.

According to another aspect of the technology described herein, systems and methods for protecting the plurality of electronic devices can be configured such that the control server receives indications that the first electronic device is considered malicious and, as a result, adds the first electronic device to a security threat list. The control server can communicate the security threat list to one or more of the plurality of electronic devices. The plurality of electronic devices can be configured to reject all communication from any device on the security threat list, such as the first electronic device. The control server can further receive an indication from a pre-certified device or an approved security patch-providing source that a security patch has been applied to the first electronic device. Upon receiving this indication of a patch being applied to the first electronic device, the control server can then retrieve validating data from the first electronic device to confirm that the security patch was applied thereto. Once this validating data is received, the control server can remove the first electronic device from the security threat list. Finally, the control sever can communicate to one or more of the electronic devices an updated security threat list with the first electronic device removed therefrom, such that the one or more electronic devices can again receive communication from the first electronic device.

In addition to dynamically tracking which devices are malicious and communicating this information or instructions related thereto to a plurality of communicably-coupled electronic devices, some aspects of the technology herein can also include method steps that provide cooperative counter attacks to malicious electronic devices. For example, such methods can include the control server instructing at least some electronic devices to execute a coordinated attack on the first electronic device while the first electronic device remains on the security threat list and/or in response to receiving a determination that the first electronic device continues to send communication of a threshold amount to at least some of the electronic devices after being placed on the security threat list. The coordinated attack can include, for example, the at least some of the electronic devices inundating the first electronic device in a manner sufficient to overload computing capabilities of the first electronic device, thereby effectively disabling the malicious device. Additionally or alternatively, the method can include the control server itself inundating the first electronic device with traffic for a predetermined amount of time and/or while the first electronic device remains on the security threat list.

Furthermore, note that blocking receipt of any communication from the first electronic device can comprise a number of techniques, such as instructing routers associated with the electronic devices to drop all data packets received from the electronic devices on the security threat list. In some aspects, the electronic devices that are not on the security list are white-listed or placed on a safe list. Furthermore, any of the electronic devices can be determined to be malicious using a variety of different techniques, such as determining that an electronic device is communicating with a device that is not white-listed, receiving indication that an electronic device deviated by a threshold amount from expected behavior, and/or receiving indication that an electronic device is sending or receiving more than an expected threshold amount of data.

Figure 1:
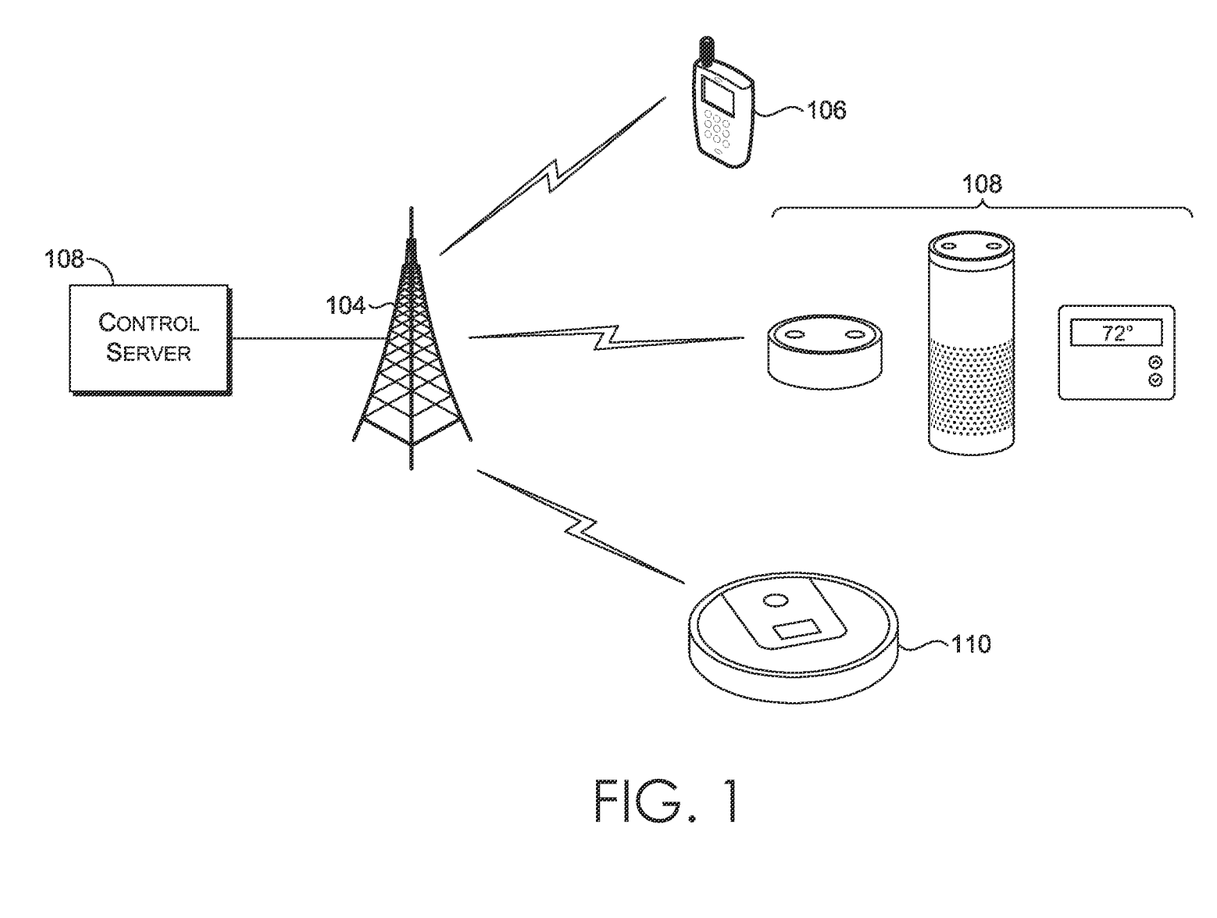
FIG. 1 depicts a diagram of an exemplary computing environment suitable for use in implementations of the present disclosure.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes at least one control server 102, one or more communication components 104, and a plurality of electronic devices 106,108,110. The control server 102 can comprise any one or more processors, communication components, memory storage, and the like. In network environment 100, the plurality of electronic devices 106,108,110 may take on a variety of forms, such as internet-of-things (IoT) devices, a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wired or wireless communications with the control server 102 and/or the one/or more communication components 104 in order to interact with a public or private network. IoT devices can comprise nonstandard electronic devices or computing devices that communicably connect to a network (directly or wirelessly) and have the ability to transmit data. For example, IoT devices can include internet-connected home appliances such as an oven, refrigerator, washer, dryer, dishwasher, or the like, as well as thermostats, automated vacuum devices, home security sensors, and the like.

Figure 5:
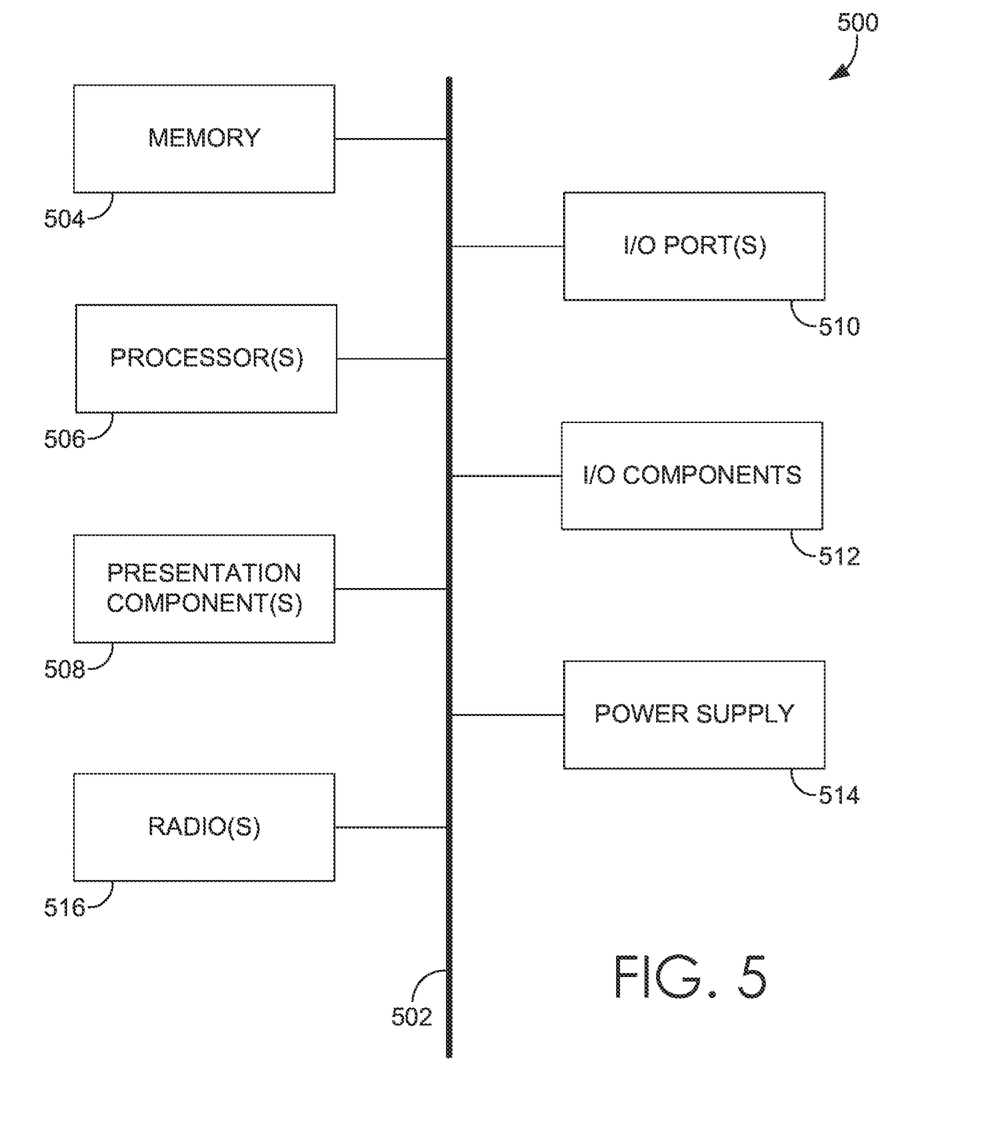
FIG. 5 depicts an exemplary computing environment suitable for use in implementations of the present disclosure.

In some aspects, the control server 102 and/or the electronic devices 106,108,110 may correspond to computing device 500 in FIG. 5. Thus, the control server 102 and/or the plurality of electronic devices 106,108,110 can include, for example, a display(s), a power source(s) (e.g., a battery), a data store(s), a speaker(s), memory, a buffer(s), a radio(s) and the like. In some implementations, the control server 102 and/or the electronic devices 106,108,110 comprise a wireless or mobile device with which a wireless telecommunication network(s) can be utilized for communication (e.g., voice and/or data communication). In this regard, the electronic devices 106,108,110 can be any mobile computing device or IoT device that communicates by way of Wi-Fi, Bluetooth, or a wireless network such as a 3G, 4G, 5G, LTE, CDMA, or any other type of network.

In some cases, the control server 102 and/or the plurality of electronic devices 106,108,110 in the network environment 100 can optionally utilize a network to communicate with other computing devices (e.g., a mobile device(s), a server(s), a personal computer(s), etc.). The network may be a telecommunications network(s), or a portion thereof. A telecommunications network might include an array of devices or components (e.g., one or more base stations). Those devices or components may form network environments similar to what is shown in FIG. 1, and may also perform methods in accordance with the present disclosure. The network can include multiple networks, as well as being a network of networks (such as a home network of devices with one or more devices connected to another larger communication network), but is shown in more simple form so as to not obscure other aspects of the present disclosure.

The network can be part of a telecommunication network that connects subscribers to their immediate service provider. In some instances, the network can be associated with a telecommunications provider that provides services (e.g., voice, data, SMS) to user devices. For example, the network may provide voice and non-voice services, including SMS, and/or data services to user devices or corresponding users that are registered or subscribed to utilize the services provided by a telecommunications provider. The network can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, the one or more communication components 104 are configured to communicate with user devices, such as the electronic devices 106,108,110 that are located within the geographical area, or cell, covered by the one or more antennas or other such communication components. The one or more communication components 104 may include one or more base stations, nodes, base transmitter stations, radios, antennas, antenna arrays, power amplifiers, transmitters/receivers, digital signal processors, control electronics, GPS equipment, and the like. In particular, the control server 102 and/or the electronic devices 106,108,110 may communicate with the one or more communication components 104, according to any one or more of a variety of communication protocols, in order to access the network.

In some aspects, the control server 102 can comprise a communication component, a processor; and one or more non-transitory computer storage devices storing computer-usable instructions that cause the processor to perform one or more of the methods described herein. These and other control server components can include, for example, any components of the computing device 800 of FIG. 8.

Figure 2:
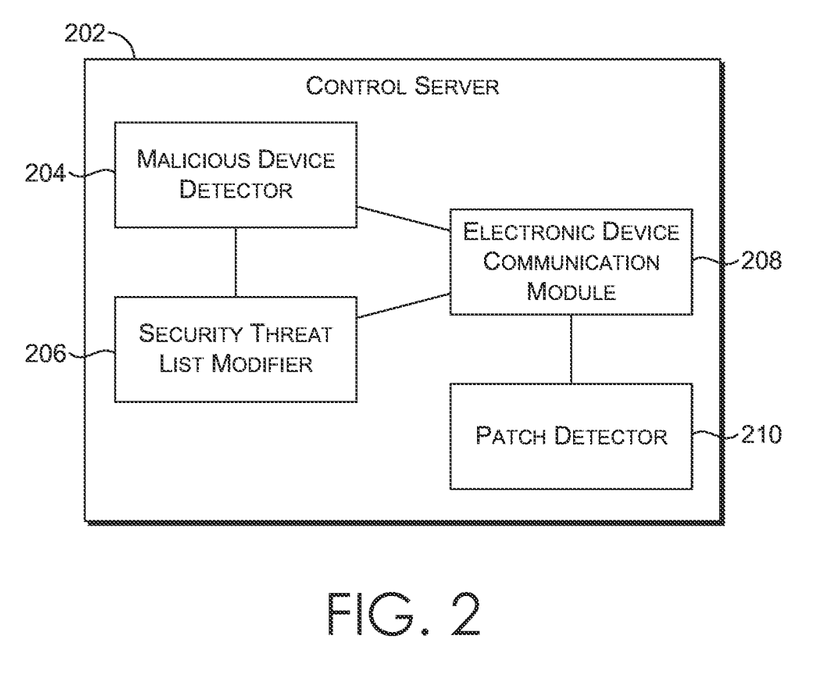
FIG. 2 depicts a diagram of a control server of FIG. 1, in accordance with aspects herein.

Furthermore, as depicted in FIG. 2, the control server 102 can be a control server 202 that includes various modules such as: a malicious device detector 204, a security threat list modifier 206, an electronic device communication module 208, and a patch detector 210. The malicious device detector 204 is operable to detect and/or receive indications that one or more of the electronic devices is considered malicious. These indications can come from external sources, such as on-device malware detection, or can be determined via the malicious device detector 204 or other modules of the control server 202 for determining that one of the electronic devices is malicious, such as various intrusion detection/prevention systems (IDS/IPS), packet capture of unencrypted data/deep packet inspection or de-encrypting encrypted traffic such as SSL strip programs. That is, detection can be performed by the control server 202 or any of the electronic devices 106-110 without departing from the scope of the technology described herein. So the indication can be received from the control server 202 itself, the electronic devices 106-110, or other third-party malicious device or malware sources.

The security threat list modifier 206 can add and remove ones of the electronic devices 106-110 to and from a security threat list. For example, the security threat list modifier 206 can add one of the electronic devices to the security threat list when the malicious device detector 204 determines or otherwise receives indication that one of the electronic devices is malicious. Furthermore, when the patch detector 210, later described herein, determines that a patch has been applied to one of the electronic devices on the security threat list, an indication of such can be sent to the security threat list modifier 206, which responds by removing or deleting that corresponding one of the electronic devices from the security threat list.

The electronic device communication module 208 can be configured to receive signals from the security threat list modifier 206 and, in response, output notification to any or all of the electronic devices 106-110 that an update to the security threat list has occurred and/or can transmit the updated security threat list to one or more of the electronic devices 106-110. This transmission of the security threat list can happen at predefined time intervals, upon each update, or upon other triggers known in the art but not described herein. In some embodiments, the electronic devices 106-110 are instructed via the control server 202 or are otherwise pre-configured to automatically cease all communications to and from any of the electronic devices on the security threat list. That is, the electronic device communication module 208 can transmit instructions to some or all of the electronic devices indicating that the electronic devices on the security threat list are not safe to communicate with and any incoming transmissions received by any of the electronic devices 106-110 listed on the security threat list should be blocked or otherwise disregarded by the electronic devices. In some embodiments, the electronic device communication module 208 can instruct the communication components 104 to send and receive signals to and from the electronic devices and/or can comprise the communication components 104.

In some embodiments, the electronic device communication module 208 can also be configured to receive signals from the electronic devices 106-110 via the communication components 104 indicating that a first one of the electronic devices 106 has requested approval to communicate with a second one of the electronic devices 108. Upon receiving such a request, the electronic device communication module 208 can determine if the second one of the electronic devices 108 is on the security threat list and then send such data to the first one of the electronic devices 106, indicating if the second one of the electronic devices 108 is or is not on the security list. The first one of the electronic devices 106 can be configured to then proceed with sending communication to and receiving communication from the second one of the electronic devices 108 if it is not on the security threat list or is otherwise indicated on a safe list.

In some aspects, the electronic device communication module 208 can be further configured to instruct at least some of the plurality of electronic devices 106-110 to execute a coordinated attack on one or more of the electronic devices listed on the security threat list. This can occur automatically in response receiving a determination that one of the electronic devices on the security threat list continues sending any communication or communication of a threshold amount to others of the electronic devices despite being on the security threat list. For example, during such a coordinated attack at least some of the electronic devices can inundate one of the electronic devices on the security threat list with large quantities of data at continual or frequent intervals sufficient to overload computing capabilities of the electronic device being attacked. This can be carried out for a predetermined amount of time, over a predetermined period of time, at predetermined intervals, or continually until the malicious device being attacked is either removed from the security threat list or the control server otherwise instructs electronic devices carrying out the coordinated attack to stop.

Additionally or alternatively, the electronic device communication module 208 can be configured to join in on the coordinated attack or be the sole provided of an attack on any or all of the electronic devices on the security threat list. For example, the electronic device communication module 208 can be used by the control server 202 to inundate one or more of the electronic devices on the security threat list with traffic or large quantities of communication and data for a predetermined amount of time and/or while the electronic device being attacked in this manner still remains on the security threat list. This can provide additional assurances that electronic devices on the security threat list are neutralized until patched, to prevent communication to and from others of the electronic devices.

The patch detector 210 can be configured to receive indication or otherwise determine that a security patch has been applied to one or more of the electronic devices on the security threat list or that one or more of the electronic devices on the security threat list are no longer considered malicious. The patch detector 210 can operate by receiving internal indication via other modules of the control server 202, and/or external indication from a trusted or pre-verified third party, that the patch was applied to a malicious one of the electronic devices listed on the security threat list. Additionally or alternatively, the patch detector 210 can be configured to check in with devices listed on the security threat list for specified indicators that one or more of the devices listed thereon are no longer considered malicious or have indeed received a patch as indicated by the internal or external indications noted above. This patch detector 210 can communicate confirmation of such a patch being applied to the security threat list modifier 104, as noted above, to remove the corresponding one of the electronic devices that received the patch from the security threat list.

Figure 3:
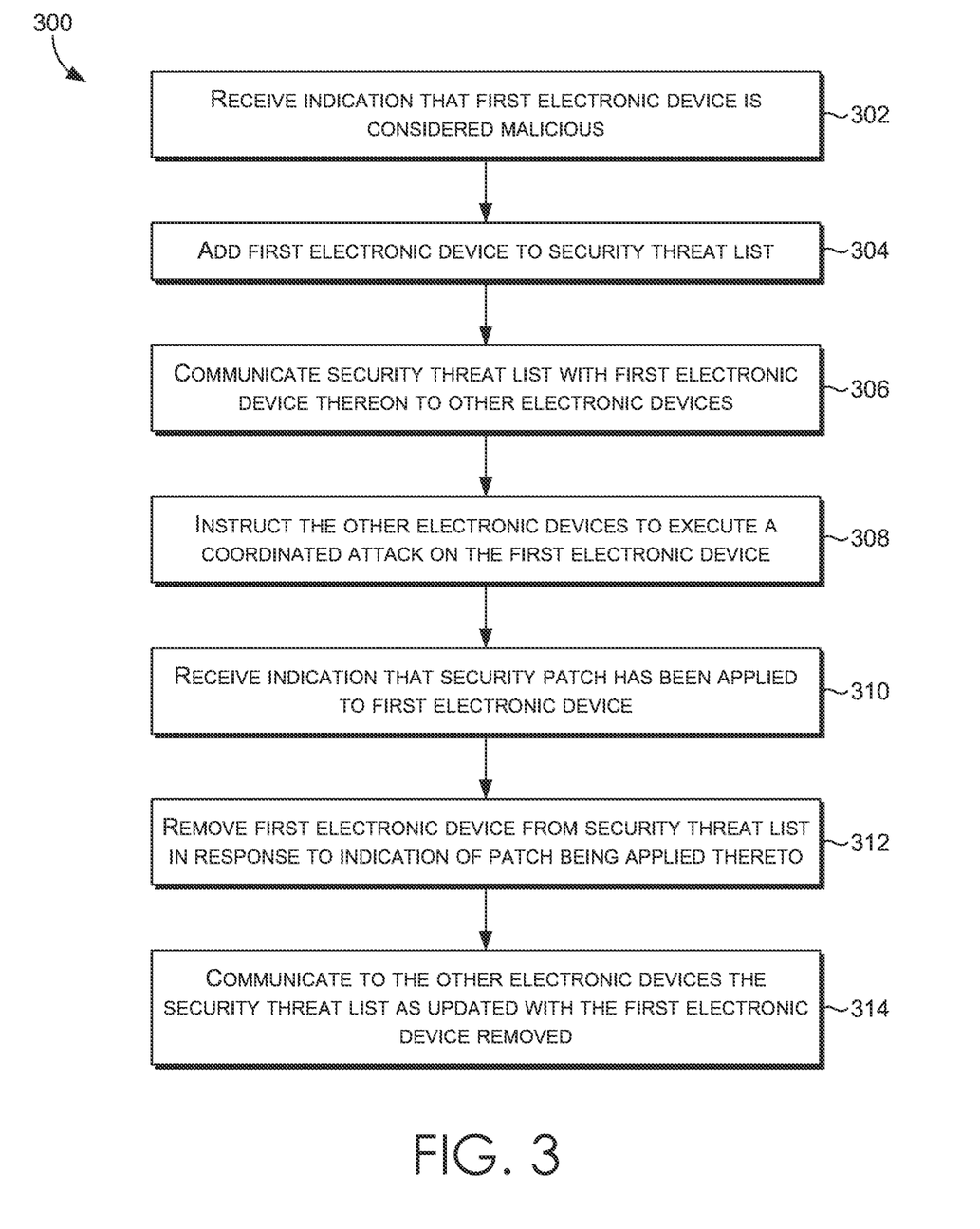
FIGS. 3-4 depict flow diagrams of exemplary methods for dynamically neutralizing malicious ones of communicating electronic devices, in accordance with aspects herein.

FIG. 3 depicts a flow diagram of an exemplary method 300 for protecting a plurality of networked electronic devices from malicious ones of the networked electronic devices, in accordance with aspects herein. At block 302, the control server 102 receives an indication that a first electronic device of the plurality of electronic devices is considered malicious. Such malicious or anomalous behavior can be detected using a variety of techniques known in the art, such as various intrusion detection/prevention systems (IDS/IPS), as well as on-device malware detection, packet capture of unencrypted data/deep packet inspection or de-encrypting encrypted traffic such as SSL strip programs.

Once the indication is received, as depicted in block 302, the control server can add the first electronic device to a security threat list maintained on the one or more databases, as depicted in block 304. For example, as depicted in FIG. 8, the security threat list can be stored on memory 804. However, the security threat list can be electronically or digitally stored using any devices or techniques known in the art, such as cloud storage or remotely-accessible databases without departing from the scope of the technology described herein.

In some aspects, each of the plurality of electronic devices that is not on the security list, including the control server, can be white-listed. White-listed, as used herein, refers to being included on a "safe list" or database considered safe and non-malicious. Thus, in some embodiments, adding the first electronic device to the security threat list also includes removing the first electronic device from the safe list or database. Indication that the first electronic device is considered malicious can include, for example, indication that the first electronic device is communicating with a device that is not white-listed, indication that the first electronic device deviated by a threshold amount from expected behavior, and/or indication that the first electronic device is sending or receiving more than an expected threshold amount of data. These and other known methods in the art for detecting malicious activity can be used to indicate to the control server that the electronic device should be moved to the security threat list.

As depicted in block 306, the control server can communicate to the plurality of electronic devices the security threat list. Furthermore, the plurality of electronic devices can be configured to cease all communications to and from any of the plurality of electronic devices on the security threat list. This can be accomplished via instructions sent along with the security threat list and/or can be instructions installed or otherwise pre-programmed into the electronic devices, such as the electronic devices 106-110 depicted in FIG. 1. In some embodiments, at least some of the plurality of electronic devices can comprise routers, and the control server can instruct the routers to drop all data packets received from the first electronic device or any such devices on the security threat list.

In other embodiments, as later described herein, steps of sending the security threat list to one or more of the electronic devices 106-110 can be omitted and replaced with methods where the electronic devices send requests to the control server 102 asking permission to communicate with the first electronic device and the control server 102 then checks the security threat list and sends approval or denial of such communication therebetween.

In some embodiments, as depicted in block 408, the control server can instruct at least some of the plurality of electronic devices to execute a coordinated attack on the first electronic device while the first electronic device remains on the security threat list. This instruction to execute the coordinated attack can occur in response to the control server 102 receiving a determination that the first electronic device continues send any communication or communication of a threshold amount to others of the electronic devices despite being on the security threat list.

In some embodiments, the coordinated attack can comprise the at least some of the plurality of electronic devices inundating the first electronic device sufficient to overload computing capabilities of the first electronic device. This can be carried out for a predetermined amount of time, over a predetermined period of time, at predetermined intervals, or continually until the first electronic device is either removed from the security threat list or the control server otherwise instructs electronic devices carrying out the coordinated attack to stop. For example, in some embodiments a third-party vendor or third-party server approved for patching of the first electronic device can communicate to the control server that a patch is going to be applied to the first electronic device. Thus, the control server can then signal to stop the coordinated attack so that the patch can be applied thereto.

In some embodiments, the control server can join in on the coordinated attack or can be the sole provided of the attack on any or all of the electronic devices on the security threat list. For example, the control server can inundate the first electronic device with traffic from the control server for a predetermined amount of time and/or while the first electronic device remains on the security threat list. This can provide additional assurances that electronic devices on the security threat list are neutralized until patched, to prevent communication to and from others of the electronic devices. In one example, the control server can electronically poison a communication channel to/from one the electronic devices on the security threat list with DDoS/targeted packet flooding attack in order to prevent the white-listed electronic devices from being infected by a known malicious electronic device.

Furthermore, as depicted in block 310, the control server can receive indication that a security patch has been applied to the first electronic device or that the first electronic device is no longer considered malicious. For example, upon being added to the security threat list, at least one verified patch source (such as the control server itself or a third-party vendor responsible for the first electronic device) or any approved security patch-providing source can be notified that a patch is needed. The verified patch sources or approved security-patch providing sources can be maintained in a database accessible by the control server. In some embodiments, indications from one or both the verified patch source and the first electronic device can be required before the control server removes the first electronic device from the security threat list. That is, the control server can receive indication from the verified patch source or another approved security patch-providing source that a security patch has been applied to the first electronic device. Then, the control server can monitor for and receive or otherwise retrieve validating data from the first electronic device to confirm that the security patch was applied to the first electronic device. For example, the control server can send a request for specific data that validates the patch was applied to the first electronic device. However, other validating methods can be used without departing from the scope of the technology herein.

As depicted in block 312, the control server can remove or delete the first electronic device from the security threat list based on receiving the indication of block 310. For example, this removing from the security threat list can be performed by the control server upon both the receiving of the indication from the approved security patch-providing source and the retrieving of the validating data from the first electronic device. However, note that verification that a patch was applied to the first electronic device or any of the electronic devices listed on the security threat list can be achieved using a variety of techniques known in the art without departing from the scope of the technology herein.

As depicted in block 314, the control server can communicate to the plurality of electronic devices the security threat list as updated with the first electronic device no longer on the security threat list. Updates to the security threat list can be communicated upon a change detected to the security threat list, which triggers the control server to broadcast the security threat list update to the electronic devices. Alternatively, the security threat list can be updated at periodic time intervals. The first electronic device can again be allowed to send and receive signals to and from others of the plurality of electronic devices once it is no longer on the security threat list.

In some aspects, the method 300 can additionally include the same steps repeated for other malicious ones of the plurality of electronic devices. For example, the control server can receive an indication that a second electronic device is considered malicious and can then add the second electronic device to the security threat list, to be handled using the same steps applied above when the first electronic device is added to the security threat list.

Figure 4:
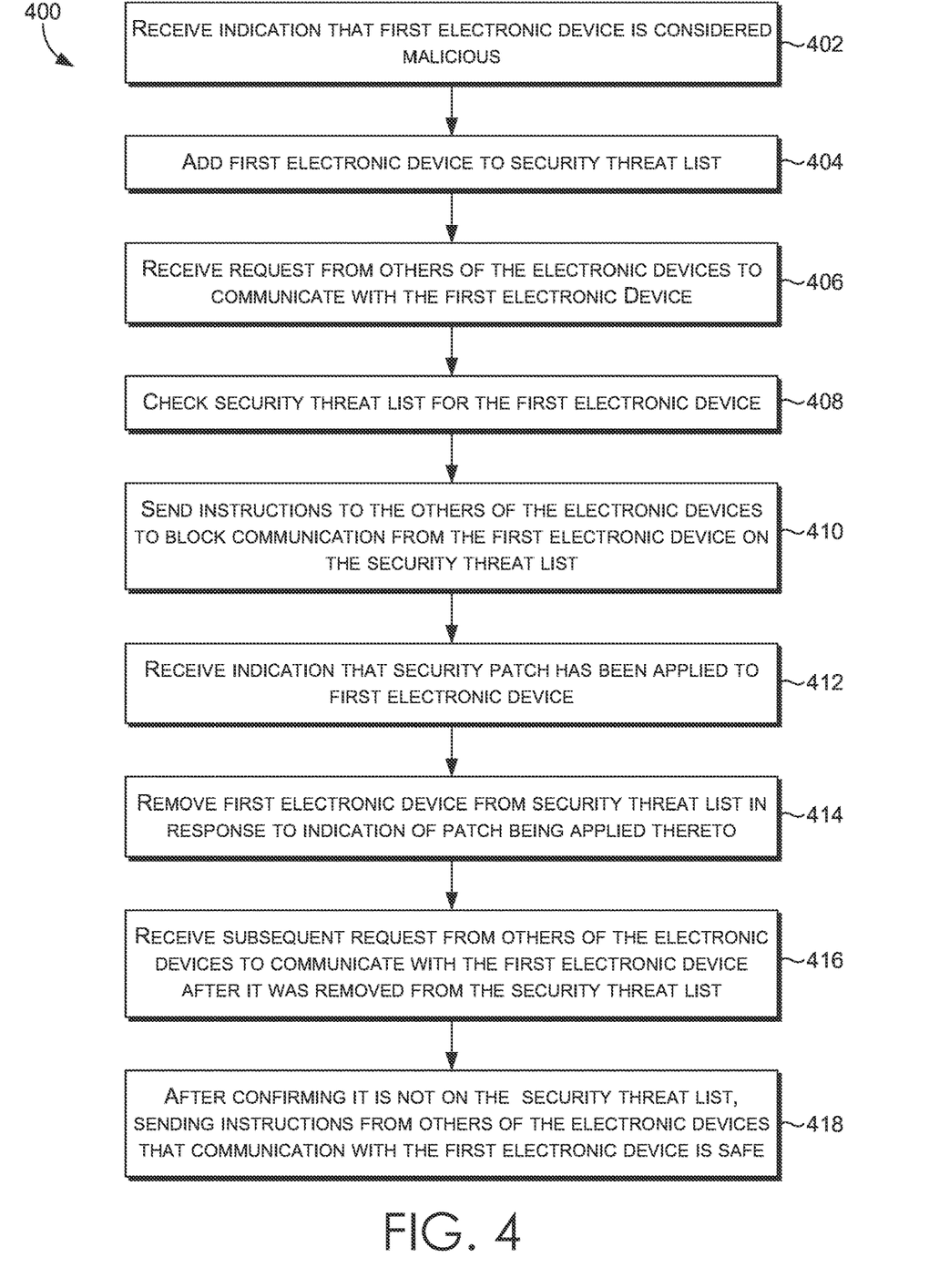

FIG. 4 depicts a flow diagram of an exemplary method 400 for protecting a plurality of networked electronic devices from malicious ones of the networked electronic devices. At block 402, the control server can receive an indication that a first electronic device of the electronic devices is considered malicious, as described in embodiments above. The control server can then, as depicted in block 404, add the first electronic device to a security threat list, such as the security threat lists described above, in response to the indication that the first electronic device is considered malicious.

The method 400 differs from method 300 in that, instead of the control server sending the security threat list or updates thereto out to the electronic devices, the electronic devices instead can request approval that a device is not on the security threat list prior to communicating with that other device. Specifically, the control server can receive requests from at least one of the others of the electronic devices to communicate with the first electronic device, as depicted in block 406, check the security threat list for the first electronic device, as depicted in block 408, and in response to determining that the first electronic device is on the security threat list, send instructions to the at least one of the others of the electronic devices to block receipt of any communication from the first electronic device, as depicted in block 410. These method steps 406-410 can occur for each communication exchanged between any of the electronic devices or alternatively can occur at pre-defined intervals of time. In yet another alternative aspect, the method steps 406-410 can occur upon initiation of a new device within a network of devices and/or in response to one or more of the electronic devices receiving unexpected communication types or quantities based on predefined usage parameters and norms.

At block 412, the control server can receive indication that a security patch has been applied to the first electronic device or that the first electronic device is no longer considered malicious. In response, the control server can remove the first electronic device from the security threat list, as depicted in block 414. This can involve deletion from the security threat list and re-instatement on to a safe list or the like.

Then, as depicted in block 416, the control server can receive subsequent requests from one or more of the electronic devices to communicate with the first electronic device after it is no longer on the security threat list, again check the security threat list, and in response to determining the first electronic device is not on the security threat list, the control server 102 can send instructions to those one or more of the electronic devices that it is now safe to receive communication from the first electronic device, as depicted in block 418.

Although the methods in FIGS. 3 and 4 generally describe determining if an electronic device is malicious or not, in some alternative embodiments of the invention, the control server can identify which communication classes and which categories of devices will be permitted to communicate with maliciously infected devices, such as the verified patch source or the approved security patch-providing source allowed to provide patches to particular ones of the electronic devices on the security threat list. Both the safe list of white-listed devices and the security threat list of malicious electronic devices described herein can be created dynamically based on monitored behavior and adjusted over time.

Example 1: In this example, an electronic device A is infected. All devices B through Z are informed that device A is infected and to not allow any traffic to be received or sent to device A until Device A's security health is improved through a security patch.

Example 2: In this example, an infected device A on the security threat list attempts to communicate to devices B through Z on a safe list by flooding the network. The control server can monitor this behavior and start a targeted attack against device A using a denial of server (DoS) attack or orchestrate a DDoS attack for a specified amount of time to ensure devices B through Z can perform a sensitive task uninterrupted. For example, if infected device A is trying to attack voting machine devices B through Z, the control server can run its targeted attack against device A for the duration of voting day.

Example 3: In this example, infected device A can receive a security patch and provide a checksum of the patched software. As a result, device A is removed from the security threat list and/or added to the safe list of electronic devices that are allowed to communicate with each other.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 8 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 816 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. One or more non-transitory computer-readable media having computer-executable instructions embodied thereon that, when executed, perform a method for improving secure communication between a plurality of electronic devices including a control server and one or more databases, the method comprising:
receiving an indication that a first electronic device of the plurality of electronic devices is considered malicious;
adding an identifier associated with the first electronic device to a security threat list maintained on the one or more databases;
communicating the security threat list to the plurality of electronic devices, wherein the plurality of electronic devices are configured to cease all communications to and from any of the plurality of electronic devices on the security threat list; and
instructing at least some of the plurality of electronic devices to execute a coordinated attack on the first electronic device while the first electronic device remains on the security threat list, wherein the coordinated attack comprises the at least some of the plurality of electronic devices inundating the first electronic device sufficient to overload computing capabilities of the first electronic device.

2. The media of claim 1, the method further comprising:
receiving an indication that a security patch has been applied to the first electronic device or that the first electronic device is no longer considered malicious;
removing the first electronic device from the security threat list; and
communicating an updated security threat list to the plurality of electronic devices, the security threat list being updated with the first electronic device no longer on the security threat list such that the plurality of electronic devices can safely communicate with the first electronic device.

3. The media of claim 1, wherein instructing the plurality of electronic devices to execute the coordinated attack occurs in response to a determination that the first electronic device continues to send communication of a threshold amount to others of the plurality of electronic devices.

4. The media of claim 1, wherein the plurality of electronic devices are IOT devices having communication capabilities with each other and the control server.

5. The media of claim 1, the method further comprising inundating the first electronic device with traffic from the control server for at least one of a predetermined amount of time or while the first electronic device remains on the security threat list.

6. The media of claim 1, wherein at least some of the plurality of electronic devices comprise routers, wherein the method further comprises instructing the routers to drop all data packets received from the first electronic device while the first electronic device is on the security threat list.

7. The media of claim 1, wherein each of the plurality of electronic devices that is not on the security list is white-listed, wherein the indication that the first electronic device is considered malicious includes at least one of: indication that the first electronic device is communicating with any device that is not white-listed, indication that the first electronic device deviated by a threshold amount from expected behavior, and indication that the first electronic device is sending or receiving more than an expected threshold amount of data.

8. A system for protecting a plurality of electronic devices, the system comprising:
a communication component;
a processor; and
one or more non-transitory computer storage devices storing computer-usable instructions that, when used by the processor, cause the processor to:
receive an indication that a first electronic device of the plurality of electronic devices is considered malicious;
add an identifier associated with the first electronic device to a security threat list;
receive requests from at least one of the others of the plurality of electronic devices to communicate with the first electronic device;
send instructions to the at least one of the others of the plurality of electronic devices to block receipt of any communication from the first electronic device; and
inundate the first electronic device with traffic from the processor for at least one of a predetermined amount of time and while the first electronic device remains on the security threat list.

9. The system of claim 8, wherein the computer-usable instructions, when used by the processor, further cause the processor to: instruct at least some of the plurality of electronic devices to execute a coordinated attack on the first electronic device while the first electronic device remains on the security threat list, wherein the coordinated attack comprises the at least some of the plurality of electronic devices inundating the first electronic device sufficient to overload computing capabilities of the first electronic device.

10. The system of claim 9, wherein causing the processor to instruct the at least some of the plurality of electronic devices to execute the coordinated attack occurs in response to receiving, via the processor, a determination that the first electronic device continues to send communication of a threshold amount to others of the plurality of electronic devices.

11. The system of claim 8, wherein blocking receipt of any communication from the first electronic device comprises instructing one or more routers associated with at least some of the plurality of electronic devices to drop all data packets received from the first electronic device.

12. The system of claim 8, wherein each of the plurality of electronic devices that is not on the security list is white-listed, wherein the indication that the first electronic device is considered malicious includes at least one of: indication that the first electronic device is communicating with a device that is not white-listed, indication that the first electronic device deviated by a threshold amount from expected behavior, and indication that the first electronic device is sending or receiving more than an expected threshold amount of data.

13. The system of claim 8, wherein the one or more non-transitory computer storage devices further store computer-usable instructions that, when used by the processor, cause the processor to:
receive an indication that a security patch has been applied to the first electronic device or that the first electronic device is no longer considered malicious; and
remove the first electronic device from the security threat list.

14. The system of claim 13, wherein the one or more non-transitory computer storage devices further store computer-usable instructions that, when used by the processor, cause the processor to:
- receive subsequent requests from one or more of the others of the plurality of electronic devices to communicate with the first electronic device when the electronic device is no longer on the security threat list; and
- send instructions to the one or more of the others of the plurality of electronic devices that it is safe to receive communication from the first electronic device.

15. A method for protecting a plurality of networked devices, the method comprising:
- receiving one or more indications that a first electronic device of the plurality of networked devices is considered malicious;
- adding the first electronic device to a security threat list;
- communicating the security threat list to the plurality of networked devices, wherein the plurality of networked devices are configured to reject all communication from any devices on the security threat list; and
- instructing at least some of the plurality of networked devices to execute a coordinated attack on the first electronic device while the first electronic device remains on the security threat list.

16. The method of claim 15, wherein the coordinated attack comprises the at least some of the plurality of networked devices inundating the first electronic device sufficient to overload computing capabilities of the first electronic device.

17. The method of claim 15, further comprising:
- receiving an indication that a second electronic device is considered malicious; and
- adding the second electronic device to the security threat list.

18. The method of claim 15, further comprising: inundating the first electronic device with traffic from the control server for at least one of a predetermined amount of time and while the first electronic device remains on the security threat list.

19. The method of claim 15, further comprising automatically white-listing each of the plurality of networked devices that is not on the security list, wherein the indication that the first electronic device is considered malicious includes at least one of: indication that the first electronic device is communicating with a device that is not white-listed, indication that the first electronic device deviated by a threshold amount from expected behavior, and indication that the first electronic device is sending or receiving more than an expected threshold amount of data.

20. The method of claim 15, further comprising:
- receiving an indication from a an approved security patch-providing source that a security patch has been applied to the first electronic device;
- retrieving validating data from the first electronic device to confirm that the security patch was applied to the first electronic device;
- removing the first electronic device from the security threat list upon both the receiving of the indication from the approved security patch-providing source and the retrieving of the validating data from the first electronic device; and
- communicating an updated security threat list to the plurality of networked devices, the updated security threat list being updated with the first electronic device removed from the security threat list such that any of the plurality of networked devices can again receive communication from the first electronic device.

* * * * *